3,778,396
REINFORCED ELASTOMER COMPOSITIONS
Kunihiko Fujimoto, Masayuki Matsui, Shigeto Kishinami, and Toshio Nishi, Tokyo, Japan, assignors to Bridgestone Tire Company Limited, Tokyo, Japan
Filed May 19, 1971, Ser. No. 144,722
Claims priority, application Japan, May 20, 1970, 45/42,384
Int. Cl. C08d 9/12; C08f 45/08
U.S. Cl. 260—27 BB    6 Claims

ABSTRACT OF THE DISCLOSURE

A new rubber composition comprising rubber reinforced by distributing therein carbon fibers, carbon black and softener in combination respectively in a particular amount. The suitable amounts are 0.02 to 0.10 volume fraction of carbon fibers, 0.05 to 0.25 volume fraction of carbon black and 0.02 to 0.30 volume fraction of softener. Substantially uniformly distributed carbon fibers, carbon black fine particles and further finer softener particles disperse the concentrated strain locally generated in the rubber composition to effectively prevent the sudden deterioration of the rubber article which phenomenon can be observed in some types of rubber. Thus the vulcanized rubbers made of said composition have high resistance to fatigue, elongation, mechanical strength and elasticity in combination which makes them very useful for tires, conveyor belts etc. to be subjected to severe dynamic conditions.

---

Figure 1:
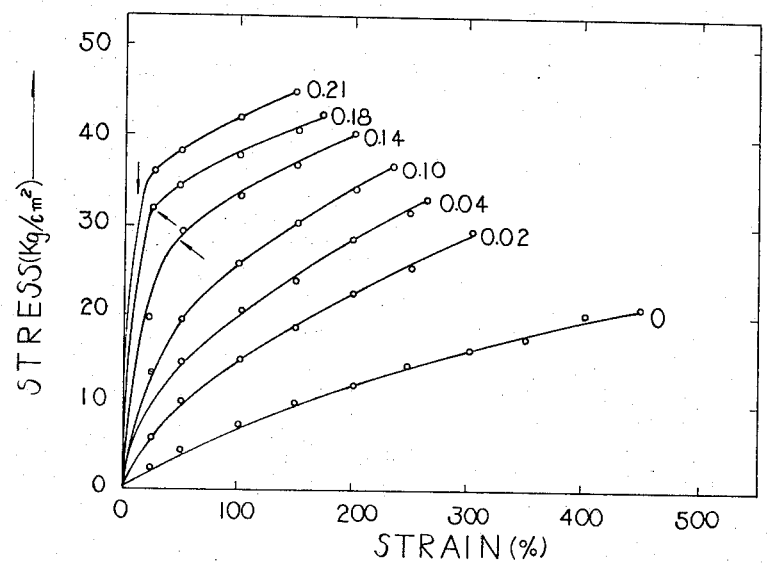

This invention relates to a novel reinforced elastomer composition having a considerably improved strength, and more particularly to such elastomer composition prepared by combining non-crystalline-under stretching type rubber material to be reinforced with chopped carbon fibers, carbon black and such softener as being capable of shifting the peak of mechanical loss tangent due to thermal diffusion to the high temperature side.

Heretofore it has been proposed to reinforce rubber by adding an inorganic filler such as carbon black, calcium carbonate, silica etc. or an organic high molecular weight resin such as melamine, urea etc. to said rubber to be distributed therein. It was also in public knowledge to reduce the particle size of the filler for extending the specific surface area so that the contact area between filler fine particles and rubber molecule chains is enlarged to promote interreactions therebetween. Various trials have been made for reinforcement by means of chemical treatment of the filler surface so as to attain close connection of fine particles of the filler with the molecule chains of the rubber.

On the other hand various low molecular weight oils which are generally called processing oils have been added for the purpose of facilitating the work of commining the filler with the rubber or as filler.

It has also been known to add chopped fibers of glass or various organic materials to the rubber reinforced according to the above to provide a reinforced rubber composition of high modules of elasticity.

According to the conventional reinforcement methods as referred to above, however, it is necessary to combine the filler of higher reinforcibility such as carbon black in a larger amount in order to satisfy the requirement for the higher modulus of elasticity and strength, which would inevitably deteriorate the desired high elongation. If the processing oil is used, however, in a larger amount for facilitating the work of combining such a large amount of filler, then the necessary high modulus of elasticity and strength would not be attained.

The reinforced elastomer composition according to the invention not only satisfies the high modulus of elasticity while maintaining the high elongation and the high strength but also is superior in fatigue resistance, different from the conventional composite elastomers reinforced as referred to above. The reason why such unexpectedly advantageous effects can be attained according to the invention is not always clear but it is guessed to be as follows.

Generally it is well known that when a rubber article is subjected to some stress or strain, then there occurs locally a concentrated stress or strain on foreign substances inevitably present in said rubber article which substances then become nuclei of breaking which tend to destroy the article. In this case if short fibers of some material are distributed in said article, said local concentration of the stress or strain would be dispersed.

Meanwhile the strain or stress as dispersed by means of said fibers in the elastomer article would be further dispersed by means of carbon black fine particles whose diameter would lie in the order ranging from several ten millimicrons to several hundred millimicrons and which are closely fixed to the rubber molecule chains. This dispersion effect can be promoted by using a softener, whose particle size as distributed in the rubber article would be in the order of a few millimicrons, as being capable of restraining more or less the mobility of the rubber molecules.

Chopped carbon fibers, carbon black fine particles and further finer softener particles respectively distributed in the rubber material can, thus, uniformly disperse the imparted stress depending on the respective dimension order according to the invention. The superior resistance to fatigue, high elongation, high strength and high elasticity of the elastomer composition according to the invention would not be attained if any one of said three conditions should not be satisfied.

The rubber material to be used in the invention is of "non-crystalline-under stretching type," which means rubbers having such characteristics that when the vulcanized rubber is uniaxially stretched at room temperature to result in 70 to 80% elongation relative to the maximum where breaking occurs, there can be observed no recognizable diffraction point due to crystalline structure on radiating X-rays normally to the direction of elongation. In such non-crystalline-under stretching type rubber which shall be abridgedly called non-crystalline rubber, there often occurs a particular phenomenon that the breaking nucleus once generated therein would bring about the sudden breaking of the rubber article. Among the non-crystalline rubbers are styrene-butadiene rubber, acrylonitrile-butadiene rubber, low cis-content polyisoprene or polybutadiene rubber, isobutyrene-isoprene rubber which shall be abridgedly called non-crystalline blending crystalline rubbers such as natural rubber, highfall under the category of a non-crystalline rubber insofar as the diffraction point of the blended rubber cannot be substantially observed upon X-ray radiation.

Carbon fibers are usually prepared by heat-treating rayon, polyacrylonitrile, hydrocarbon pitch, lignin fibers to be carbonized. Any of said carbonized fibers may be used in the invention, but such carbon fibers as prepared by heating at a temperature below 1500° C. so that active groups remain on the fiber surface to readily fixed to the rubber molecules, are preferable. The carbon fibers can be chemically combined with the rubber during vulcanization different from the conventionally used glass or organic material fibers which must be bonded with the rubber by means of an adhesive, and furthermore the specific strength which means the ratio of the tensile strength to the specific gravity as well as the specific elasticity which means the ratio of the elasticity to the modulus of specific gravity of said carbon fibers are sufficiently high.

The carbon fibers available in the market are usually of 3 to 20 micron diameter but there is no critical limit in the diameter of the carbon fibers to be used in the invention. As to the length, however, it is preferable to use fibers having such length that the distribution peak lies in the range of 50 to 500 microns after having been distributed in the rubber material, since if the length is too long the fibers would be broken so much when said fibers are mixed and kneaded together with carbon black and softener into the rubber material or when the finished rubber article is subjected to load to be fatigued, and on the other hand when it is too short so as to approximate the order of size of the carbon black particle then the meaning of combining the carbon fibers into the rubber composition as referred to above would be lost.

The softener to be used in the invention must be such as capable of restraining more or less mobility of rubber molecules for the purpose of promoting the stress dispersion effect or of shifting the peak temperature to the mechanical loss tangent due to thermal dispersion of the rubber composition to the high temperature. Thus the softener is preferably intersoluble with the rubber. The fact that the molecular mobility is restrained means that the peak temperature to the mechanical loss tangent i.e. the ratio of dynamic loss modulus to dynamic storage modulus corresponding to the glass transition point of the rubber combined with the softener, said peak temperature being determined by measuring the respective mechanical loss tangents, at various temperatures ranging from that lower than the glass transition point of the rubber itself up to the sufficiently high temperature, of such rubber-softener composition to which tensile or shearing strain is imparted with vibration of a particular frequency, is made higher than the peak temperature with respect to similar measurements on the rubber without any softener added. More definitely it can be said that such softener having glass transition temperature higher than that of the rubber itself fall in said category, which are for instance aromatic oil, coumarone-indene resin, rosin, phenol-aldehyde resin, terpene-phenol resin, polyterpene resin, xylene-formaldehyde resin, petroleum resin, mixtures thereof and modified forms thereof. It would be appreciated from the above that the meaning or purpose of the softener to be added in the invention is different from the conventional processing oil.

As to the carbon black, it is preferable to use carbon blacks having as high reinforcibility as possible. More particularly, furnace black or channel black, or carbon black of ISAF, HAF, GPF or MPC grade having an average particle size ranging from 20 to 200 millimicrons and a surface area ranging from 200 to 10 m.²/gr. is preferable.

Such carbon fibers, carbon black and softener as referred to above are combined together with an aging-preventing agent or antioxidant and other additives into such rubber as referred to above, to be kneaded. The kneading may be done by means of any of the usual open roll mill, Banbury mixer, rubber kneader etc., but when it is particularly desired to control the carbon fiber breaking so that the length distribution ranges from 50 to 500 microns in the finished composition, the carbon fibers are preferably blended into the rubber within a shorter time after the carbon black, softener and the other additives have been combined.

The rubber composition thus prepared is subjected to the desired forming and vulcanization steps.

The respective amounts of the carbon fibers, the carbon black and the softener to be added according to the invention shall be explained hereinafter.

In the first place, pitch carbon fibers having a 7.5 micron diameter were added in various amounts to the basic composite as specified in the following Table 1 so that the average length of the fibers as distributed in the composite was 180 microns, and the rubber composition was vulcanized for 30 minutes at a temperature of 145° C. so as to be subjected to the stress-strain tests of which results are shown in FIG. 1.

TABLE 1

| | Parts by weight |
|---|---|
| Styrene-butadiene rubber | 100 |
| Aromatic oil | 3 |
| Stearic acid | 3 |
| Zinc white | 5 |
| Sulphur | 3 |
| Accelerator M [1] | 1.5 |
| Antioxidant D [2] | 1.5 |

[1] Mercaptobenzothiazole.
[2] Phenyl-$\beta$-naphthylamine.

In said FIG. 1, the numerical values, 0.21, 0.18, 0.14, 0.10, 0.04 and 0.02 represent volume fractions of the carbon fibers added to said basic composite. It will be appreciated therefrom that when too many fibers are added there occurs a fold point as illustrated by an arrow in the stress-strain curve which means that a necking phenomenon was generated in the test material. When the necking has once occurred, the test material cannot be restored to the initial status even if the strain is removed. This was not considerably changed even if carbon black was added. Thus it can be said that the carbon fibers are preferably added in the amount of 0.02 to 0.10 volume fraction.

Figure 2:
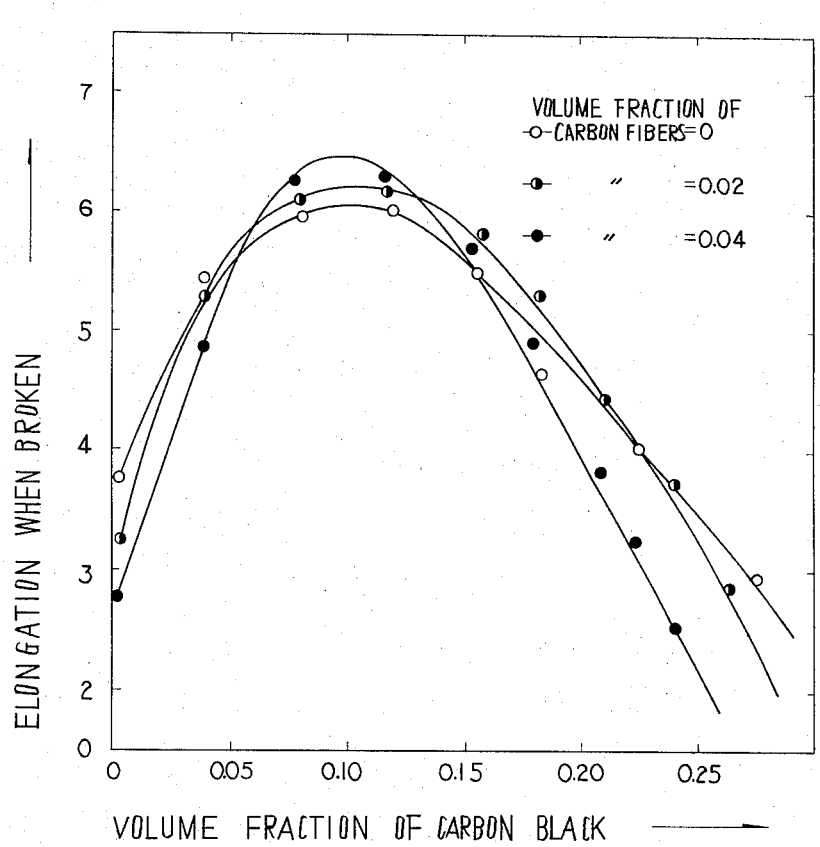
Figure 3:
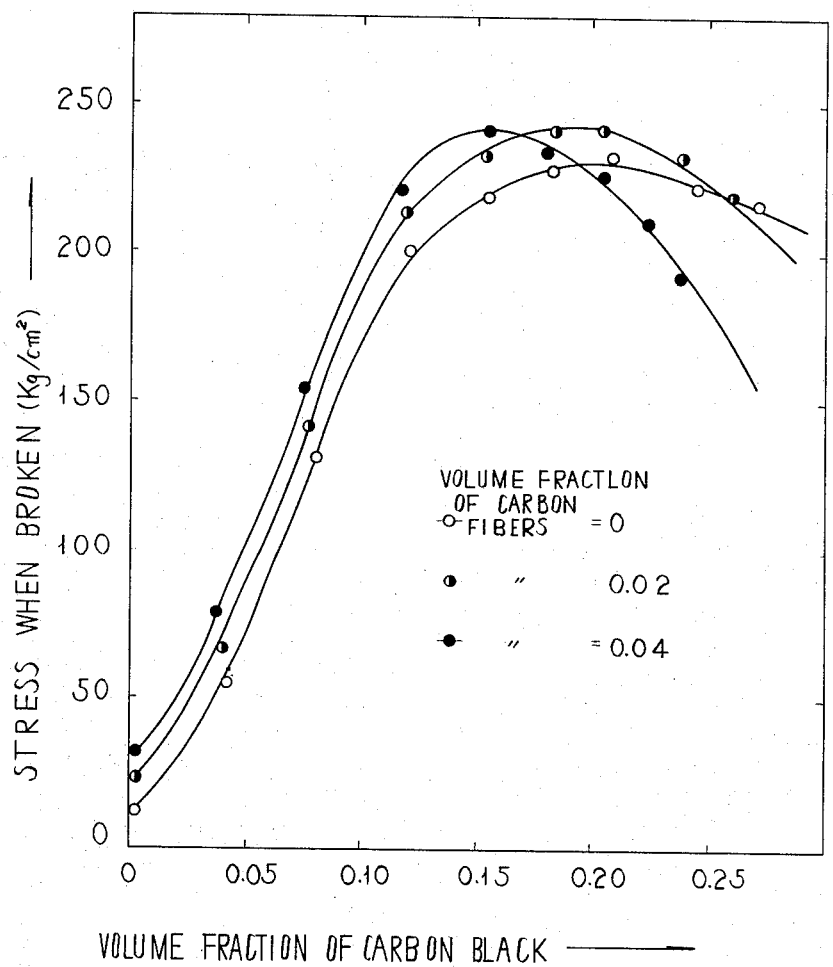

Secondly the amount of the carbon black to be added shall be explained. The carbon black was added in various amounts respectively to the basic composite just as referred to in said Table 1, to a composite containing carbon fibers in an amount of 0.02 volume fraction and to a composite containing carbon fibers in an amount of 0.04 volume fraction, to be vulcanized as referred to above. The resulting test materials were subjected to the stretching tests until they were broken. The maximum elongations and stresses when breaking occurred are respectively shown in FIGS. 2 and 3, from which it can be appreciated that there are naturally peaks or maximum values of the elongation and stress depending on the amount of carbon black to be added and that the curves are made sharper as more carbon fibers are added. It is clear that the from 0.05 to 0.25 volume fraction.

Figure 4:
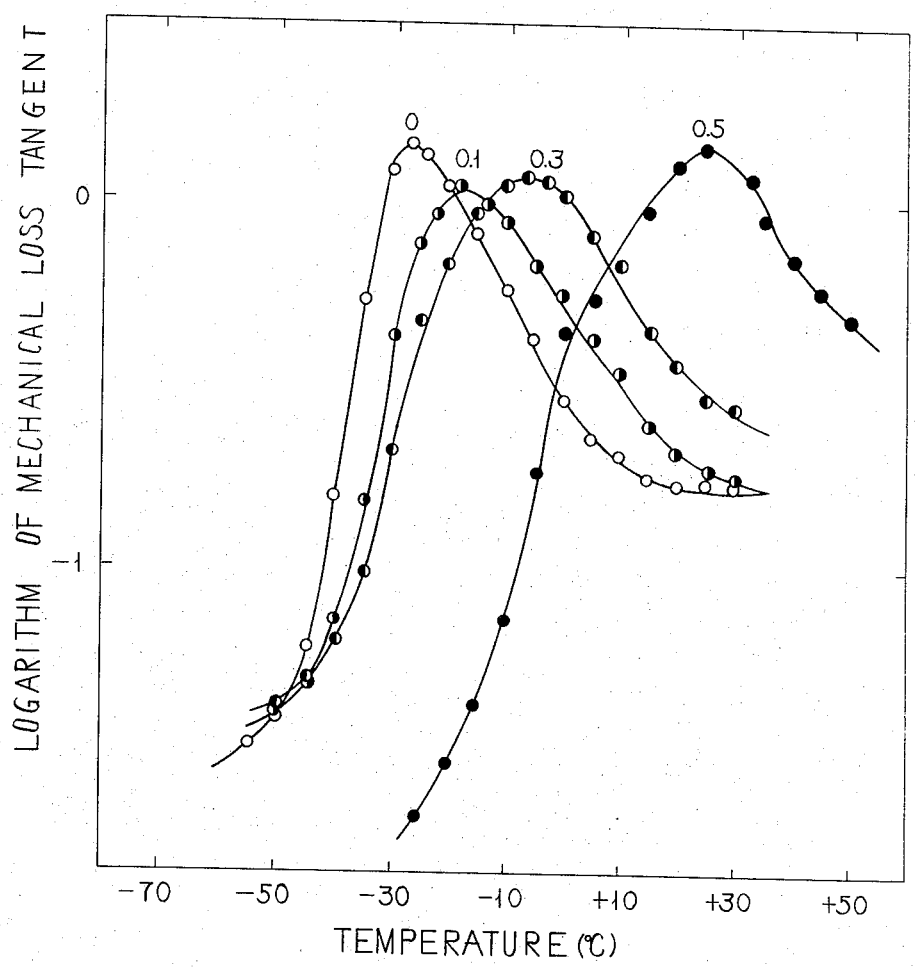

Finally the amount of the softener to be added to restrain the mobility of the rubber molecule chains shall be considered. Since the carbon black and the carbon fibers do not have much effect on said mobility, the composite as shown in said Table 1 in which aromatic oil is substituted with rosin was used for finding out a suitable softener amount range with no addition of carbon fibers nor carbon black. The composite without being vulcanized was subjected to the tests at temperature from −80° C. to +40° C. under vibration of 100 hertz for determining dynamic storage modulus (kg./cm.³) as well as mechanical loss tangents, which results are shown in FIG. 4 in which the numerical figures 0 to 0.5 represent the amounts of softener added in volume fractions. As clearly seen therefrom the peak temperature to the mechanical loss tangent due to the composite glass transition is shifted to the higher temperature side as the softener is added in a larger amount so as to restrain the rubber molecular chain mobility. It is not preferable, however, to combine too much softener because the mechanical loss tangent at room temperature is made too high which would adversely affect on the thermal characteristics and retard the vulcanization of the composite. The desirable range of the softener amount is thus from 0.02 to 0.30 volume fraction.

The rubber composition reinforced by adding the carbon fibers, the carbon black and the softener in the respective amounts as referred to above according to the invention, when vulcanized, has a high modulus of elasticity, high elongation and high mechanical strength unexpectedly in combination and more particularly is excellent also in resistance to fatigue which could not be attained in the various rubber compositions hithertofore proposed and produced. The improved rubber composition is useful particularly for various rubber articles which must endure severe dynamic conditions such as tires, conveyor belts etc.

The invention shall be explained in more detail in the following examples which are given not for limiting the scope of the invention thereto but merely for the purpose of explanation.

EXAMPLE 1

The comparative tests were made with respect to the fatigue resistance between the rubber compositions according to the invention as represented by B and D and those as represented by A, C and E which have been conventionally used, whose formulae are given in Table 2.

TABLE 2

|  | A | B | C | D | E |
|---|---|---|---|---|---|
| Styrene-butadiene rubber | 100 | 100 | 100 | 100 | 100 |
| Carbon black (HAF) | 44 | 44 | 44 | 44 | 51.5 |
|  | (0.17) | (0.15) | (0.15) | (0.15) | (0.18) |
| Carbon fibers |  | 7.5 |  | 7.5 |  |
|  |  | (0.03) |  | (0.03) |  |
| Processing oil |  | 5 |  |  |  |
|  |  | (0.04) |  |  |  |
| Aromatic oil |  |  | 5 |  |  |
|  |  |  | (0.03) |  |  |
| Piccodiene |  |  |  | 20 | 20 | 20 |
|  |  |  | (0.12) | (0.12) | (0.12) |
| Stearic acid | 3 | 3 | 3 | 3 | 3 |
| Zinc white | 5 | 5 | 5 | 5 | 5 |
| Sulphur | 2.5 | 2.5 | 2.5 | 2.5 | 2.5 |
| Accelerator M [1] | 1.2 | 1.2 | 1.5 | 1.5 | 1.5 |
| Accelerator DPG [2] | 0.2 | 0.2 | 0.2 | 0.2 | 0.2 |
| Antioxidant [3] | 1.5 | 1.5 | 1.5 | 1.5 | 1.5 |
| Scorch preventive [4] | 0.5 | 0.5 | 0.5 | 0.5 | 0.5 |

[1] Mercaptobenzothiazole.
[2] Diphenyl-guanidine.
[3] Phenyl-B-naphthylamine.
[4] N-nitroso-phenyl-2-naphthylamine.

NOTES:
The unit is a part by weight and that bracketed is a volume fraction. "Piccodiene" is a petroleum resin manufactured by Pennsylvania Industrial Chemical Corp.

The compositions as referred to above were vulcanized to be formed into two ply rayon tires each of which is of 58 mm. radius in the cross section, 298 mm. diameter and 116 mm. width. Every tire was filled with air under pressure to an inner pressure of 5 kgr./m.$^2$ and driven to rotate by 500 r.p.m., to which was pressed a drum of 100 mm. diameter and having the end radius of 5 mm. to give a deflection $\delta$ to the tire, in which the inner temperature was controlled to be kept at 80° C. The experiments were made every three times. The results are given in following Table 3 from which it is appreciated that the tires made of the compositions B and D according to the invention have a considerably longer life until separation (number of rotations) than those of the usual composition A, the composition C which was prepared by adding only the softener for restraining the rubber molecular mobility to said A, the composition E as prepared by further adding carbon black but no carbon fibers, regardless of the degree of deflection caused.

TABLE 3

|  | A | B | C | D | E |
|---|---|---|---|---|---|
| Deflection $\delta$ (mm.) | 5.0 | 5.0 | 5.0 | 5.0 | 5.0 |
|  | 7.5 | 7.5 | 7.5 | 7.5 | 7.5 |
|  | 10.0 | 10.0 | 10.0 | 10.0 | 10.0 |
| Number of rotations until separation (10$^5$ rotations) | 8.2 | 38 | 7.9 | 28 | 8.0 |
|  | 2.7 | 5.1 | 3.1 | 6.3 | 2.1 |
|  | 1.2 | 2.3 | 1.4 | 2.6 | 1.1 |
| Number of separations | 2 | 2 | 3 | 3 | 1 |
|  | 1 | 1 | 1 | 1 | 2 |
|  | 1 | 1 | 4 | 2 | 1 |
| Average area of one separation (cm.$^2$) | 6.9 | 1.1 | 3.1 | 3.3 | 6.7 |
|  | 13.0 | 2.1 | 6.2 | 3.2 | 12.0 |
|  | 17.5 | 3.2 | 4.5 | 1.3 | 16.3 |
| Heat conduction (10$^{-3}$ cm.$^2$/sec.) | 1.39 | 1.49 | 1.39 | 1.54 | 1.35 |

The tires made of the reinforced rubber composition of the invention showed 4 times longer life until separation occurred when subjected to 5.0 mm. deflection, 3 times longer life in case of a 7.5 mm. deflection and 2 times longer life under 10.0 mm. deflection in comparison with the tires of the conventional rubber composition, which means the fatigue resistance has been improved considerably in the reinforced rubber composition according to the invention. As to the number of which occurred, there was found no considerable difference but the average area of the separated locations was decreased down to ¼ to ⅒ in comparison with the tires made of the usual compositions, from which the transmission of the breaking nucleus generated in the rubber material has been considerably eliminated according to the invention. In said table there is shown also the heat conduction (cm.$^2$/sec.) with respect to the thermal characteristics. The larger the values become, the better the heat conduction becomes when heat is locally generated in the rubber, so that the rubber article is hardly destroyed. This thermal characteristic has been considerably improved in the invention.

EXAMPLE 2

In order to confirm and demonstrate the effect of the softener added according to the invention, the rubber compositions as shown in the following Table 4 were vulcanized for 30 minutes at a temperature of 145° C. to be subjected to physical property comparative tests and concurrently to the fatigue resistance tests according to the method of Example 1 (7.5 mm. deflection).

The mechanical loss tangent was determined using the viscoelasticity spectrometer manufactured by Iwamoto Manufacturing Co., Ltd. under the vibration of 100 hertz. The peak temperature of the mechanical loss tangent was −30° C. when the softener was not added. The temperature was shifted to the higher side for compositions D and F according to the invention, but for control compositions G and H it was shifted to the lower temperature side.

TABLE 4

|  | D | F | G | H |
|---|---|---|---|---|
| Styrene-butadine rubber | 100 | 100 | 100 | 100 |
| Carbon fibers | 7.5 | 7.5 | 7.5 | 7.5 |
|  | (0.03) | (0.03) | (0.03) | (0.03) |
| Carbon black | 44 | 44 | 44 | 44 |
|  | (0.15) | (0.15) | (0.14) | (0.14) |
| Aromatic oil | 20 |  |  |  |
|  | (0.12) |  |  |  |
|  |  | 20 |  |  |
|  |  | (0.12) |  |  |
| Spindle oil |  |  | 20 |  |
|  |  |  | (0.14) |  |
| DOA [1] |  |  |  | 20 |
|  |  |  |  | (0.14) |
| Stearic acid | 3 | 3 | 3 | 3 |
| Zinc white | 5 | 5 | 5 | 5 |
| Sulphur | 2.5 | 2.5 | 2.5 | 2.5 |
| Accelerator M [2] | 1.5 | 1.5 | 1.5 | 1.5 |
| Accelerator DPG [3] | 0.2 | 0.2 | 0.2 | 0.2 |
| Antioxidant [4] | 1.5 | 1.5 | 1.5 | 1.5 |
| Scorch preventive [5] | 0.5 | 0.5 | 0.5 | 0.5 |

[1] Dioctyl-adipate.
[2] Mercapto-benzothiazole.
[3] Diphenyl-guanidine.
[4] Phenyl-$\beta$-naphthylamine.
[5] N-nitroso-phenyl-2-naphthylamine.

NOTE.—The unit is a part by weight and that bracketed is a volume fracton.

The rubber compositions as shown in said Table 4 and according to the invention have high tensile strength and high elongation at break and concurrently high elasticity and is quite excellent in fatigue resistance in view of the long life until separation of the plied tire (number of rotations), as seen from the Table 5 as given hereinafter.

TABLE 5

|  | D | F | G | H |
|---|---|---|---|---|
| Tensile strength (kgr./cm.$^2$) | 240 | 220 | 195 | 160 |
| Elongation at break (percent) | 590 | 540 | 500 | 450 |
| 100% modulus (kgr.) | 46 | 43 | 40 | 35 |
| Peak temperature of chemical loss tangent (° C.) | −15 | −25 | −33 | −31 |
| Life until separation (10$^5$ rotations) | 6.3 | 5.0 | 2.5 | 1.8 |

What we claim is:
1. A rubber composition comprising a non-crystalline under stretching type rubber in combination with (A) chopped carbon fibers in the amount of 0.02 to 0.10 volume fraction, (B) carbon black in the amount of 0.05 to 0.25 volume fraction and (C) softener as capable of shifting the peak temperature of the mechanical loss tangent due to thermal diffusion to the higher temperature side in the amount of 0.02 to 0.30 volume fraction substantially uniformly distributed therein.
2. A rubber composition as claimed in claim 1, in which said carbon fibers have a length distribution peak in the range of 50 to 500 microns when the fibers have been distributed in the rubber composition.
3. A rubber composition as claimed in claim 1, in which said carbon fibers contain active groups.
4. A rubber composition as claimed in claim 1, in which said carbon black is selected from the group consisting of furnace black and channel black having an average particle size of 20 to 200 millimicrons and a specific surface area of 200 to 10 m.$^2$/gr.
5. A rubber composition as claimed in claim 1, in which said softener is selected from the group consisting of rosin, petroleum resin, aromatic oil, coumarone-indene resin, phenol-aldehyde resin, terpene-phenol resin, polyterpene resin, xylene-formaldehyde resin, mixtures thereof and modified forms thereof.
6. A rubber composition as claimed in claim 1, in which said rubber is a styrene-butadiene copolymer.

References Cited
UNITED STATES PATENTS

| | | | |
|---|---|---|---|
| 3,129,197 | 4/1964 | Farrell et al. | 260—33.6 AQ X |
| 3,562,193 | 2/1971 | Leeks et al. | 260—33.6 AQ X |
| 3,397,167 | 8/1968 | Gruver | 260—33.6 AQ |
| 3,503,919 | 3/1970 | Cadus | 260—41.5 X |
| 3,573,086 | 3/1971 | Lambdin | 161—Carbon Digest |

LEWIS T. JACOBS, Primary Examiner

U.S. Cl. X.R.

260—33.6 R, 33.6 AQ, 41.5 R